United States Patent
Benson et al.

(10) Patent No.: US 9,608,826 B2
(45) Date of Patent: Mar. 28, 2017

(54) SYSTEM AND METHOD FOR PARTNER KEY MANAGEMENT

(75) Inventors: Glenn Stuart Benson, Newton, MA (US); Sean Croston, Andover, MA (US)

(73) Assignee: JPMorgan Chase Bank, N.A., New York, NY (US)

(*) Notice: Subject to any disclaimer, the term of this patent is extended or adjusted under 35 U.S.C. 154(b) by 1422 days.

(21) Appl. No.: 12/826,311

(22) Filed: Jun. 29, 2010

(65) Prior Publication Data

US 2010/0332399 A1 Dec. 30, 2010

Related U.S. Application Data

(60) Provisional application No. 61/221,540, filed on Jun. 29, 2009.

(51) Int. Cl.
*H04L 9/32* (2006.01)
*G06Q 20/38* (2012.01)
*G06Q 20/40* (2012.01)
*G06Q 40/00* (2012.01)

(52) U.S. Cl.
CPC ....... *H04L 9/3268* (2013.01); *G06Q 20/3829* (2013.01); *G06Q 20/40* (2013.01); *G06Q 40/00* (2013.01); *H04L 9/3247* (2013.01); *H04L 2209/56* (2013.01)

(58) Field of Classification Search
CPC .................................................. H04L 9/3268
See application file for complete search history.

(56) References Cited

U.S. PATENT DOCUMENTS

| | | | |
|---|---|---|---|
| 3,705,385 | A | 12/1972 | Batz |
| 3,860,870 | A | 1/1975 | Furuya |
| 3,896,266 | A | 7/1975 | Waterbury |

(Continued)

FOREIGN PATENT DOCUMENTS

| | | |
|---|---|---|
| CA | 2430549 | 6/2002 |
| DE | 19731293 | 1/1999 |

(Continued)

OTHER PUBLICATIONS

Benson et al., Credentials Management for High-Value Transactions, Springer-Verlag, 2010, all pages.*

(Continued)

*Primary Examiner* — Jacob C. Coppola
(74) *Attorney, Agent, or Firm* — Goodwin Procter LLP

(57) ABSTRACT

A system and method for implementing an interoperable credential management protocol for processing online transactions. The protocol, referred to as the Partner Key Management (PKM) protocol provides an improved alternative to traditional public key infrastructure (PKI), particularly for use in high-value commercial transactions which require additional controls on the use of credentials for authentication and authorization. According to the PKM protocol, a user may take advantage of credential interoperability by using the same credential at a plurality of different financial institutions for authentication or digital signatures. Additionally, the credential interoperability achieved according to the PKM protocol allows the user to employ the same credential at a plurality of financial institutions for the purpose of digital or electronic signatures.

12 Claims, 7 Drawing Sheets

(56) References Cited

U.S. PATENT DOCUMENTS

| | | |
|---|---|---|
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,212,792 A | 5/1993 | Gerety et al. |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,315,504 A | 5/1994 | Lembie |
| 5,317,683 A | 5/1994 | Hager et al. |
| 5,321,841 A | 6/1994 | Eat |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davies et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Green |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,644,778 A | 7/1997 | Burks et al. |
| 5,649,118 A | 7/1997 | Carlisle et al. |
| 5,653,914 A | 8/1997 | Holmes et al. |
| 5,657,383 A | 8/1997 | Gerber |
| 5,659,165 A | 8/1997 | Jennings |
| 5,659,616 A * | 8/1997 | Sudia ............................. 705/76 |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |

(56) References Cited

U.S. PATENT DOCUMENTS

| | | |
|---|---|---|
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,190 A | 12/1998 | Kleehammer et al. |
| 5,848,400 A | 12/1998 | Change |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakley, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Bellinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Change |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,177 A * | 12/1999 | Sudia ............................ 713/191 |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,070,147 A | 5/2000 | Harms et al. |

(56) References Cited

U.S. PATENT DOCUMENTS

| | | |
|---|---|---|
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,170,011 B1 | 1/2001 | MacLeod Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthan |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,330,543 B1 | 12/2001 | Kepecs |
| 6,332,192 B1 | 12/2001 | Boroditsky et al. |
| 6,336,104 B1 | 1/2002 | Walker et al. |
| 6,339,423 B1 | 1/2002 | Sampson et al. |
| 6,343,279 B1 | 1/2002 | Bissonette et al. |
| 6,343,323 B1 | 1/2002 | Kalpio et al. |
| 6,345,261 B1 | 2/2002 | Feidelson et al. |
| 6,349,242 B2 | 2/2002 | Mahaffey |
| 6,349,336 B1 | 2/2002 | Sit et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,446,053 B1 | 9/2002 | Elliott |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas et al. |
| 6,510,523 B1 | 1/2003 | Perlman et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |
| 6,609,113 B1 | 8/2003 | O'Leary et al. |

(56) References Cited

U.S. PATENT DOCUMENTS

| | | |
|---|---|---|
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,671,818 B1 | 12/2003 | Mikurak |
| 6,675,261 B2 | 1/2004 | Shandony |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,388 B1 | 7/2004 | Tsimelzon |
| 6,766,370 B2 | 7/2004 | Glommen et al. |
| 6,769,605 B1 | 8/2004 | Magness |
| 6,772,146 B2 | 8/2004 | Khemlani et al. |
| 6,775,782 B1 * | 8/2004 | Buros et al. .................. 726/2 |
| 6,785,810 B1 | 8/2004 | Lirov et al. |
| 6,789,115 B1 | 9/2004 | Singer et al. |
| 6,792,572 B1 | 9/2004 | Frohlick |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,832,587 B2 | 12/2004 | Wampula et al. |
| 6,847,991 B1 | 1/2005 | Kurapati |
| 6,856,970 B1 | 2/2005 | Campbell et al. |
| 6,868,391 B1 | 3/2005 | Hultgren |
| 6,892,231 B2 | 5/2005 | Jager |
| 6,892,307 B1 * | 5/2005 | Wood et al. .................. 726/8 |
| 6,907,566 B1 | 6/2005 | McElfresh et al. |
| 6,925,481 B2 | 8/2005 | Singhal et al. |
| 6,934,848 B1 | 8/2005 | King et al. |
| 6,937,976 B2 | 8/2005 | Apte |
| 6,938,158 B2 | 8/2005 | Azuma |
| 6,950,936 B2 | 9/2005 | Subramaniam et al. |
| 6,954,932 B2 | 10/2005 | Nakamura et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,000,105 B2 * | 2/2006 | Tallent et al. .................. 713/156 |
| 7,006,983 B1 | 2/2006 | Packes et al. |
| 7,010,512 B1 | 3/2006 | Gillin et al. |
| 7,020,696 B1 | 3/2006 | Perry et al. |
| 7,032,110 B1 | 4/2006 | Su et al. |
| 7,039,812 B2 * | 5/2006 | Kawan et al. .................. 713/186 |
| 7,051,199 B1 | 5/2006 | Berson et al. |
| 7,051,330 B1 | 5/2006 | Kaler et al. |
| 7,058,817 B1 | 6/2006 | Ellmore |
| 7,072,870 B2 * | 7/2006 | Tallent et al. .................. 705/76 |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,185,094 B2 | 2/2007 | Marquette et al. |
| 7,188,181 B1 | 3/2007 | Squier et al. |
| 7,197,470 B1 | 3/2007 | Arnett et al. |
| 7,203,909 B1 | 4/2007 | Horvitz et al. |
| 7,299,201 B2 | 11/2007 | Jammes |
| 7,321,864 B1 | 1/2008 | Gendler |
| 7,370,011 B2 | 5/2008 | Bennett |
| 7,690,032 B1 * | 3/2010 | Peirce .................. 726/9 |
| 7,904,722 B2 * | 3/2011 | Sudia et al. .................. 713/176 |
| 8,190,893 B2 * | 5/2012 | Benson .................. G06Q 20/02 713/168 |
| 8,583,928 B2 * | 11/2013 | Benson .................. G06Q 20/02 713/170 |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0027474 A1 | 10/2001 | Nachman et al. |
| 2001/0029464 A1 | 10/2001 | Schweitzwer |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2002/0002479 A1 | 1/2002 | Almog et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0069174 A1 * | 6/2002 | Fox et al. .................. 705/52 |
| 2002/0077964 A1 | 6/2002 | Brody et al. |
| 2002/0077978 A1 | 6/2002 | O'Leary et al. |
| 2002/0087447 A1 | 7/2002 | McDonald et al. |
| 2002/0087471 A1 | 7/2002 | Ganesan et al. |
| 2002/0095443 A1 | 7/2002 | Kovack |
| 2002/0099826 A1 | 7/2002 | Summers et al. |
| 2002/0099936 A1 | 7/2002 | Kou et al. |
| 2002/0104006 A1 | 8/2002 | Boate et al. |
| 2002/0104017 A1 | 8/2002 | Stefan |
| 2002/0107788 A1 | 8/2002 | Cunnhingham |
| 2002/0143874 A1 | 10/2002 | Marquette et al. |
| 2002/0152163 A1 | 10/2002 | Bezos et al. |
| 2002/0156900 A1 | 10/2002 | Marquette et al. |
| 2002/0165949 A1 | 11/2002 | Na |
| 2002/0174010 A1 | 11/2002 | Rice, III |
| 2002/0178113 A1 | 11/2002 | Clifford et al. |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0041165 A1 | 2/2003 | Spencer et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |

(56) References Cited

U.S. PATENT DOCUMENTS

| | | | |
|---|---|---|---|
| 2003/0084647 A1 | 5/2003 | Smith et al. | |
| 2003/0088552 A1 | 5/2003 | Bennett et al. | |
| 2003/0105981 A1 | 6/2003 | Miller et al. | |
| 2003/0110399 A1 | 6/2003 | Rail | |
| 2003/0115160 A1 | 6/2003 | Nowlin et al. | |
| 2003/0119642 A1 | 6/2003 | Gates et al. | |
| 2003/0149594 A1 | 8/2003 | Beazley et al. | |
| 2003/0154171 A1 | 8/2003 | Karp et al. | |
| 2003/0154403 A1 | 8/2003 | Keinsley et al. | |
| 2003/0159072 A1 | 8/2003 | Bellinger et al. | |
| 2003/0163700 A1 | 8/2003 | Paatero | |
| 2003/0163733 A1 | 8/2003 | Barriga-Caceres et al. | |
| 2003/0167229 A1 | 9/2003 | Ludwig et al. | |
| 2003/0177067 A1 | 9/2003 | Cowell et al. | |
| 2003/0191549 A1 | 10/2003 | Otsuka et al. | |
| 2003/0204460 A1 | 10/2003 | Robinson et al. | |
| 2003/0225688 A1 | 12/2003 | Dobbins | |
| 2004/0031856 A1 | 2/2004 | Atsmon et al. | |
| 2004/0049702 A1 | 3/2004 | Subramaniam et al. | |
| 2004/0117409 A1 | 6/2004 | Scahill et al. | |
| 2004/0153378 A1 | 8/2004 | Perkowski | |
| 2004/0199774 A1* | 10/2004 | Zissimopoulos et al. | 713/179 |
| 2004/0215514 A1 | 10/2004 | Quinlan | |
| 2004/0254991 A1 | 12/2004 | Malik et al. | |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0091126 A1 | 4/2005 | Junger | |
| 2005/0120180 A1 | 6/2005 | Schornbach et al. | |
| 2005/0144463 A1* | 6/2005 | Rossebo et al. | 713/185 |
| 2005/0193056 A1 | 9/2005 | Schaefer et al. | |
| 2005/0278641 A1 | 12/2005 | Mansour et al. | |
| 2006/0029261 A1 | 2/2006 | Hoffman et al. | |
| 2006/0116949 A1 | 6/2006 | Wehunt et al. | |
| 2006/0155985 A1* | 7/2006 | Canard et al. | 713/156 |
| 2006/0174122 A1* | 8/2006 | Falch et al. | 713/175 |
| 2006/0274970 A1 | 12/2006 | Seki et al. | |
| 2007/0118891 A1* | 5/2007 | Buer | 726/8 |
| 2009/0210703 A1* | 8/2009 | Epstein et al. | 713/157 |
| 2011/0321127 A1* | 12/2011 | Pitroda et al. | 726/3 |

FOREIGN PATENT DOCUMENTS

| | | | |
|---|---|---|---|
| EP | 855659 | 7/1998 | |
| EP | 884877 | 12/1998 | |
| EP | 917119 | 5/1999 | |
| EP | 1014318 | 6/2000 | |
| EP | 1022664 | 7/2000 | |
| EP | 1056043 | 11/2000 | |
| EP | 1089516 | 4/2001 | |
| JP | 10187467 | 7/1998 | |
| JP | 2003-24329 | 11/2000 | |
| JP | 2001-134672 | 5/2001 | |
| JP | 2005-242976 | 9/2005 | |
| WO | 97/43736 | 11/1997 | |
| WO | 99/40507 | 8/1999 | |
| WO | 99/52051 | 10/1999 | |
| WO | 00/68858 | 11/2000 | |
| WO | 01/18656 | 3/2001 | |
| WO | 01/35355 | 5/2001 | |
| WO | 01/43084 | 6/2001 | |
| WO | 01/88659 | 11/2001 | |
| WO | 02/17082 | 2/2002 | |
| WO | 2004/079603 | 9/2004 | |
| WO | WO 2009107102 A2 * | 9/2009 | G06Q 20/00 |

OTHER PUBLICATIONS

Vecchio et al., CredEx: User-Centric Credential Management for Grid and Web Services, IEEE, 2005, all pages.*

Jones et al., Credentials for Privacy and Interoperation, IEEE, 1995, all pages.*

Bills, Steve, Different Approaches to Corporate Authentication, American Banker Online, 2005, all pages.*

Rannenberg, Kai, Identity management in mobile cellular networks and related applications, Information Security Technical Report, vol. 9, No. 1, 2004, all pages.*

Benson, Glenn, "Portable security transaction protocol," 2006, Elsevier, all pages.*

ABC News Internet Ventures, Getting Smart with Java, http://abcnews.go.com/sections/DailyNews/amex_java000606.html (last visited Jun. 6, 2000).

Amy Cortese et al, Cyberspace: Crafting software that will let you build a business out there, Bus. Week, Feb. 27, 1995, at 78.

Amy K. Larsen, Internet Goes to Work for Builders, InternetWeek, Nov. 16, 1998, at 26.

Anne Knowles, Improved Internet security enabling on-line commerce, PC Week, Mar. 20, 1995.

Anne Thomas, Sun Microsystems, Enterprise Javabeans Technology, http://java.sun.com (last visited May 21, 1999).

Associates National Bank (Delaware), Our Cards, http://www.theassociates.com (last visited Apr. 6, 1999).

Aversion Therapy: Banks overcoming fear of the 'Net to develop safe Internet-based payment system with Netscape Communicator, Network World, Dec. 12, 1994.

Barry D. Bowen, Sun Microsystems, Banking on JAVA Technology, http://java.sun.com (last visited May 21, 1999).

Bechtel Construction Operations Incorporated Standardizes on Primavera's Expedition Contract Management Software, Bus. Wire, Jul. 27, 1999.

Calyx Software, Point for Windows Version 3.x Interface Marketing Guide (Dec. 8, 1999).

David Bank, Cash, Check, Charge—what's next?, Seattle Times, Mar. 6, 1995, at D-1.

David D. Owen, Facilities Planning and Relocation 108, 110, 112-114, 117-127, 137-138, 199-217, 241, 359 (R.S. Means Company, Inc. 1993).

David G. Cotts, The Facility Management Handbook 135-40 (2d ed. 1998).

David P. Kormann et al, Risks of the Passport Single Signon Protocol, 33 Computer Networks 51-58 (2000).

David Post, E-Cash: Can't Live With It, Can't Live Without It, Am. Lawyer, Mar. 1995, at 116.

Dominique Deckmyn, San Francisco Manages $45M Project Via Web-Based Service, ComputerWorld, Aug. 9, 1999, at 14.

Don Clark, Microsoft, Visa to Jointly Develop PC Electronic-Shopping Software, Wall St. J., Nov. 9, 1994, at B9.

eCharge Corporation, http://www.echarge.com/company/index.htm (last visited Dec. 3, 1999).

FreeMarkets Online, Inc., http://www.freemarkets.com (last visited Apr. 1999).

G&D America's Multi-application Smart Card Selected for Combined Payroll and 'Virtual Banking' Program in Mexico, Bus. Wire, Apr. 24, 1998.

GE TPN Post Service Use Guidelines, Getting Started (Apr. 26, 1999).

GE TPN Post Service Use Guidelines, Resource Center (Apr. 26, 1999).

Gerry Vandenengel, Cards on the Internet: Advertising on a $3 Bill, World Card Tech., Feb. 1995, at 46.

Harris InfoSource, http://www.harrisinfo.com (last visited Apr. 26, 1999).

Hewlett-Packard Co., Understanding Product Data Management (Apr. 26, 1999).

Jeffrey Kutler, A different drummer on the data highway, Am. Banker, May 12, 1995, at 14.

Jeffrey Kutler, Cash Card Creator Looking Beyond Mondex, Am. Banker, Feb. 9, 1995, at 16.

John N. Frank, Beyond direct mail, Credit Card Mgmt., Aug. 1996, at 54.

Jonathan Berry et al, Database: A Potent New Tool for Selling, Bus. Week, Sep. 5, 1994, at 56.

Karen Epper, A player goes after big bucks in cyberspace, Am. Banker, May 5, 1995, at 17.

(56) References Cited

OTHER PUBLICATIONS

Keith Brown, The Builders Revolution, BuildNet Publishing (1996).
Kennedy Maiz, Fannie Mae on the Web, Newsbyte, May 8, 1995.
Kim A. Strassel, Dutch Software Concern Experiments with Electronic 'Cash' in Cyberspace, Wall St. J., Apr. 17, 1995, at B6.
Ko Fujimura et al, A World Wide Supermarket Scheme Using Rights Trading System, Proc. 7th Int'l Conf. on Parallel and Distributed Systems: Workshops, pp. 289-294 (Jul. 2000).
Ko Fujimura et al, XML Voucher: Generic Voucher Language, Internet Engineering Task Force, http://www.
Lester D. Taylor, Telecommunications Demand Analysis in Transition, IEEE Proc. 31st Int'l Conf. on System Sciences, pp. 409-15 (1998).
Lynda Radosevich, Is workflow working?, CNN.com (Apr. 6, 1999), http://www.cnn.com/TECH/computing/9904/06/workflow.ent.idg.
M. Alshawi et al, An IFC Web-Based Collaborative Construction Computer Environment: Wisper, Proc. Int'l Conf. Construction IT (1999).
Markus Jakobsson et al, Secure and lightweight advertising on the Web, 31 Computer Networks 1101-1109 (1999).
Marvin Sirbu et al, NetBill: An Internet Commerce System Optimized for Network Delivered Services, IEEE Personal Comm., pp. 34-39 (Aug. 1995).
Mary C. Lacity et al, The Information Systems Outsourcing Bandwagon, 35 Sloan Mgmt. Rev. 73 (1993).
Method of Protecting Data on a Personal Computer, IBM Technical Disclosure Bulletin 26:6, p. 2530 (Nov. 1985).
Muse Technologies, Inc., http://www.musetechnologies.com (last visited Apr. 26, 1999).
Nelson E. Hastings et al, A Case Study of Authenticated and Secure File Transfer: The Iowa Campaign Finance Reporting System (ICFRS), Performance, Computing and Comm. Conf., pp. 532-538 (Feb. 1997).
Object Management Group, CORBA for Beginners, http://www.omg.org (last visited May 25, 1999).
Object Management Group, CORBA Overview, http://pent21.infosys.tuwein.ac.at (last visited May 25, 1999).
Object Management Group, Library, http://www.omg.org (last visited May 25, 1999).
Object Management Group, What is CORBA?, http://www.omg.org (last visited May 25, 1999).
Omware, Inc., http://web.archive.org/web/20000226033405/www.omware.com/products.html (last visited Nov. 28, 2005).
Paul Seibert, Facilities Planning & Design for Financial Institutions 15, 272, 274-77 (1996).
Philip Carden, The New Face of Single Sign-On, Network Computing (Mar. 22, 1999), http://www.networkcomputing.com/1006/1006f1.html.
Primavera Systems Delivers Expedition Express, Bus. Wire, Feb. 23, 1999.
Primavera Systems, Inc., Expedition Contract Control Software Version 6.0 User's Guide (1998).
Primavera Systems, Inc., http://www.primavera.com (1999).
Primavera Systems, Inc., Primavera and PurchasePro.com to Create E-Commerce Marketplace for Construction Industry, Sep. 21, 1999, available at http://web.archive.org/web/2000412175935/http://www.purchasepro.com (last visited Jun. 23, 2005).
Product Data Integration Technologies, Inc., http://www.pdit.com (last visited Apr. 26, 1999).
Richard Mitchell, Netlink Goes After an Unbanked Niche, Card Tech., Sep. 1999, at 22.
Robert Barnham, Network brings together producers and companies, Feb. 1, 1994, at 80.
Roberta Fusaro, Builders moving to Web tools, ComputerWorld, Nov. 16, 1998, at 51.
Robyn Meredith, Internet bank moves closer to virtual reality, USA Today, May 5, 1995, at B1.
Safe Single-Sign-On Protocol with Minimal Password Exposure No-Decryption, and Technology-Adaptivity, IBM Technical Disclosure Bulleting 38:3, pp. 245-48 (Mar. 1995).
Server/Applet/HTML Authentication Process with Single Sign-On, IBM Research Disclosure 429128, pp. 163-165 (Jan. 2000).
Shimon-Craig Van Collie, Construction Loan Tool from PriMerit, New Trend, Bank Mgmt., Apr. 1990, at 60.
Siebel Systems, Inc., http://www.siebel.com (last visited Nov. 17, 1999).
SmartAxis by, http://www.smartaxis.co.uk/seller/howitworks.html (last visited Feb. 23, 2001).
Steven Marlin, Chasing document management, Inform, pp. 76-82 (Apr. 1999).
Stuart J. Johnston, Pondering Passport: Do you trust microsoft with you data?, PC World, Sep. 24, 2001.
Sun Microsystems, Applets, http://java.sun.com (last visited May 21, 1999).
Sun Microsystems, JAVA Remote Method Invocation Interface, http://java.sun.com (last visited May 21, 1999).
Sun Microsystems, JAVA Servlet API, http://java.sun.com (last visited May 21, 1999).
Sun Microsystems, JAVA Technology in the Real World, http://java.sun.com (last visited May 21, 1999).
Sun Microsystems, JNDI Overview, http://java.sun.com (last visited May 21, 1999).
Sun Microsystems, Staying in Touch with JNDI, http://java.sun.com (last visited May 21, 1999).
Sun Microsystems, The JDBC Data Access API, http://java.sun.com (last visited May 21, 1999).
Temporary Global Passwords, IBM Technical Disclosure Bulletin 26:3, pp. 451-453 (Mar. 1993).
The check is in the E-mail, Info. Today, Mar. 1, 1995, at 43.
ThomasNet, Inc., http://www.thomasnet.com (last visited Apr. 26, 1999).
ThomasNet, Inc., SoluSource for Engineers by Engineers, http://www.solusource.com (last visited Apr. 26, 1999).
Timothy M. Chester, Cross-Platform Integration with XML and SOAP, IP Pro, pp. 26-34 (Sep./Oct. 2001).
Tom Jepsen, SOAP Cleans up Interoperability Problems on the Web, IT Pro, pp. 52-55 (Jan./Feb. 2001).
Tomas Hernandez Jr., Software Solutions, Building Design & Construction, Nov. 1999, at 38.
U.S. Small Business Administration, PRO-Net, www.sba.gov (last visited Jun. 8, 1999).
V. Ryan et al, Internet Engineering Task Force, Schema for Representing CORBA Objects in an LDAP Directory (work in progress), http://tools.ietf.org/html/draft-ryan-corba-schema-00 (Apr. 15, 1999).
Vanessa Houlder, OFT gives the individual top priority, Fin. Times, Jun. 8, 1994.
Visa International, Consortium Created to Manage Common Electronic Purse Specifications, http://www.visa.com/av/news/PRmisc051199.vhtml (last visited Feb. 23, 2001).
W. Richard Mosig Jr., Software Review: The Construction Project Manager, Cost Engineering, Jan. 1996, at 7.
Wingspan Bank, At Your Request, http://www.wingspanbank.com (last visited Aug. 10, 1999).

\* cited by examiner

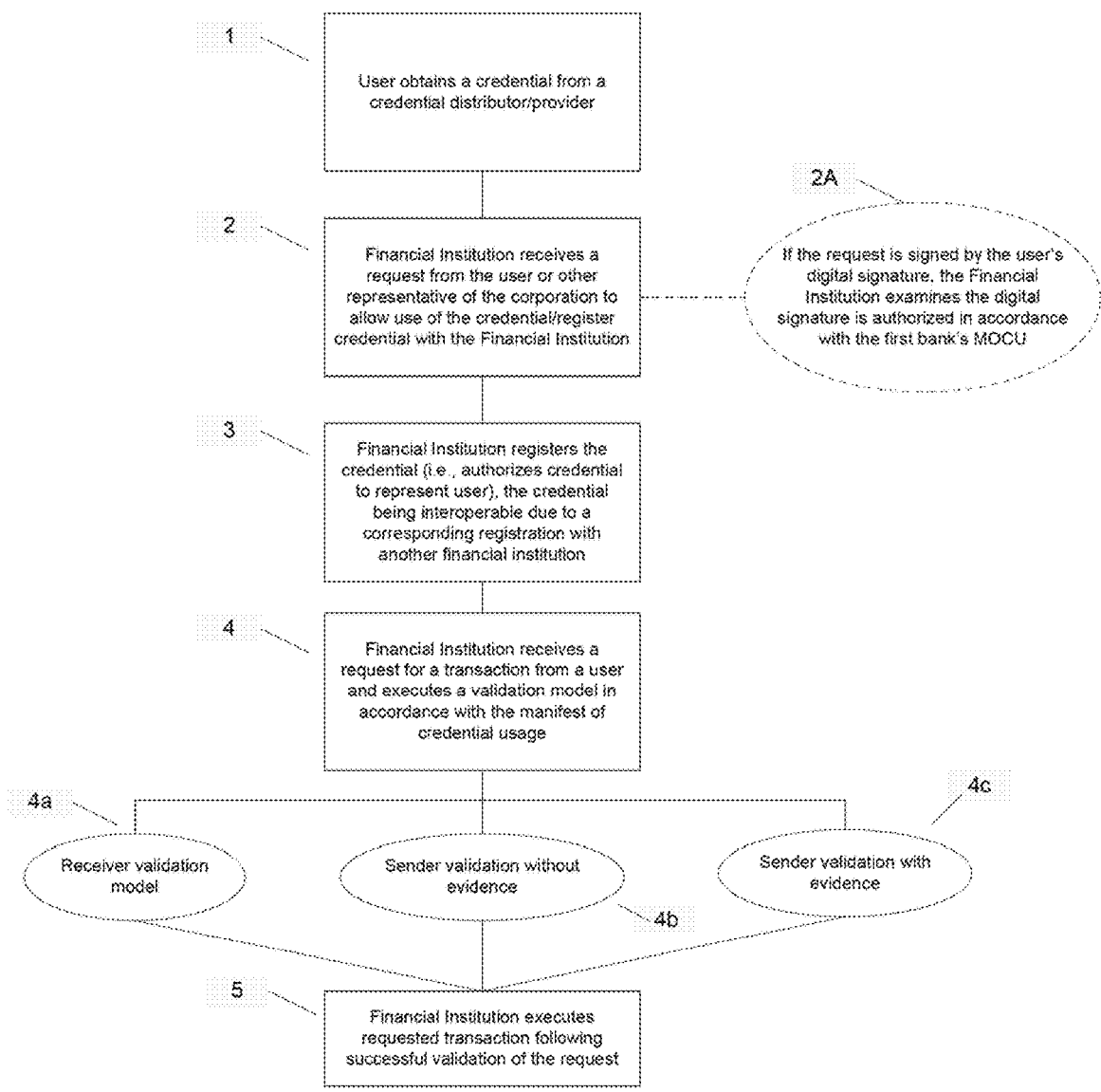

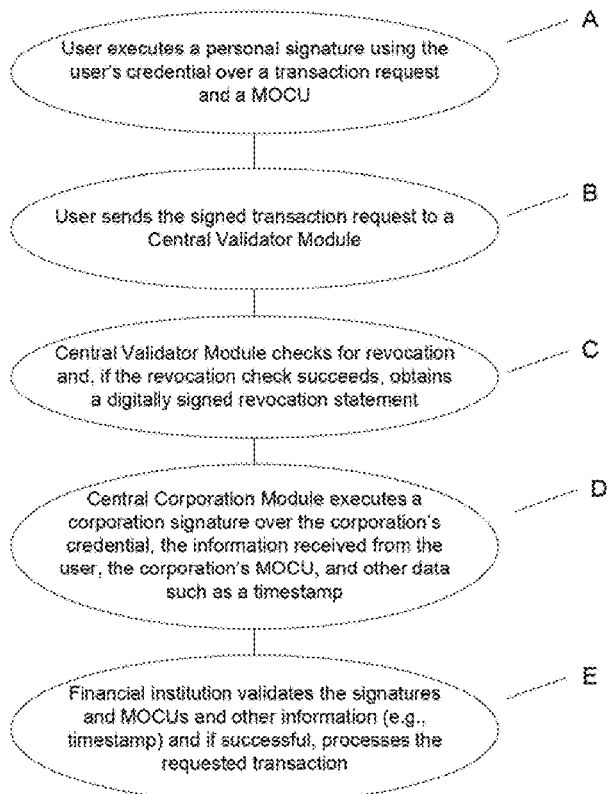
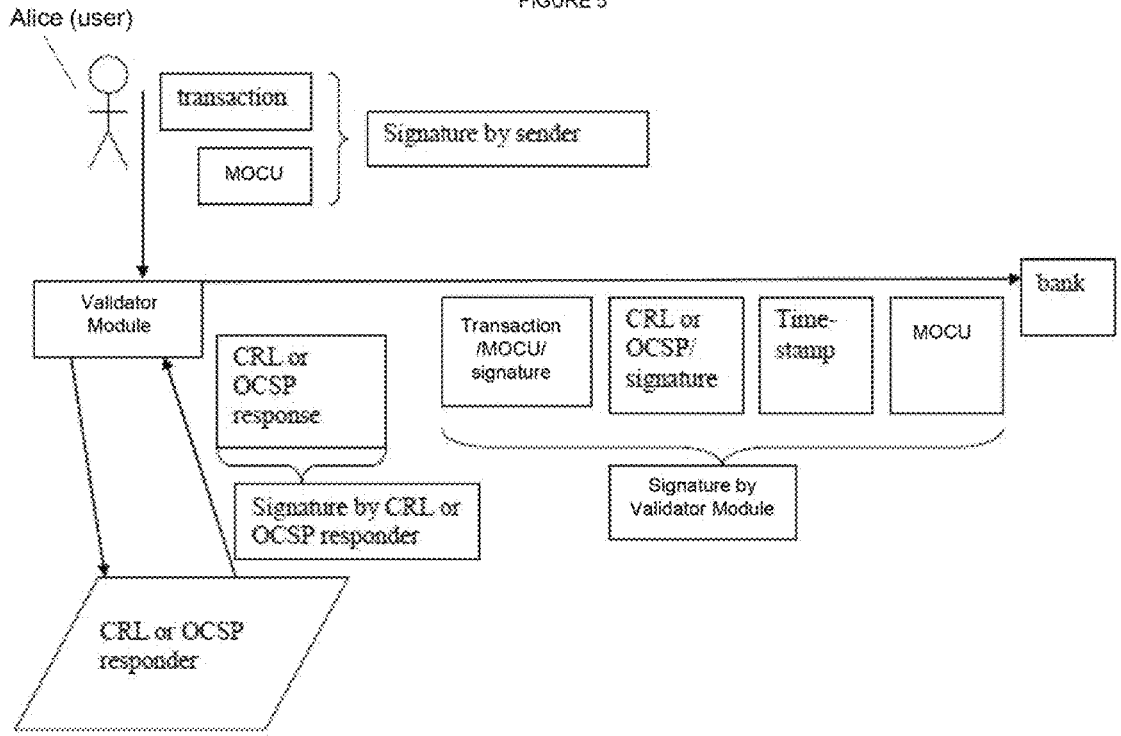

SYSTEM AND METHOD FOR PARTNER KEY MANAGEMENT

CROSS-REFERENCE TO RELATED APPLICATION

This application claims the benefit of U.S. Provisional Application No. 61/221,540, titled "System and Method for Partner Key Management", filed on Jun. 29, 2009. U.S. Provisional Application No. 61/221,540 is hereby incorporated by reference herein.

FIELD OF THE INVENTION

The present invention relates generally to payment processing and management, and, more particularly, to a system and method for administering and managing a vendor and buyer invoicing and payment process in a vendor contract compliant manner.

BACKGROUND OF THE INVENTION

Public Key Infrastructure (PKI) is a set of hardware, software, people, policies, and procedures needed to create, manage, distribute, use, store, and revoke digital certificates. In cryptography, a PKI is an arrangement that binds public keys with respective user identities by means of a certificate authority (CA). In a PKI arrangement, the user identity must be unique within each CA domain. The binding is established through the registration and issuance process, which, depending on the level of assurance the binding has, may be carried out by software at a CA, or under human supervision. The PKI role that assures this binding is called the Registration Authority (RA). For each user, the user identity, the public key, their binding, validity conditions and other attributes are made unforgeable in public key certificates issued by the CA.

Although useful in certain contexts, the Public Key Infrastructure (PKI) has an inherent liability shortcoming that prohibits widespread adoption of inter-financial institution interoperability, especially in connection with high monetary value transactions/payments. Although existing security frameworks may satisfy the requirements associated with small monetary value transactions/payments, wholesale banking requires a framework capable of meeting the security requirements associated with value-bearing transactions of US$500,000,000 and beyond.

Most conventional PKI-based systems are adapted to deploy certificates to computers as opposed to people. Some PKI systems have had success deploying SSL certificates onto web servers. Although SSL certificate technology allows for deployment to individual users, market penetration for personal certificates is limited due to a number of reasons. For example, in the cases where an end-user obtains a personal certificate, inter-organizational interoperability is severely restricted.

One primary reason for this restriction is a lack of a viable liability model which addresses security requirements established, among many various factors, by a financial institution's regulatory, contractual, and technical environments. It is well-established that financial institutions are subject to an array of regulatory, contractual, and business requirements to effectively identify individuals who engage in business with the financial institution. Banking operations are subject to a multitude of regulations, including technical audit requirements designed to protect the safety and soundness of the financial institution's electronic operations. Among these regulatory requirements are standards governing the processes to set up credentials for a financial institution's customers. In the United States, banking regulators generally publish regulatory guidelines which, in effect, establish technical and other requirements for regulated financial institutions, including processes governing systems for the electronic transmission of value bearing instructions.

If a registration authority contractually agrees to issue credentials used by other legal entities, then the registration authority typically seeks to limit its liability contractually. The economic reality of registration authorities servicing wholesale funds transfers is that most registration authorities could not or would not honor the levels of liability experienced for a faulty acceptance (e.g., transfers of hundreds of millions or billions of dollars), leaving the financial institution as the de facto liable party. In view of this potential liability, wholesale financial institutions typically opt to accept payment instructions for which it has absolute certainty of the identity and legitimacy of the individual transmitting the instructions. If a financial institution were to accept a credential issued by another party in an interoperable PKI model, the financial institution would need to trust absolutely the other party's connection between the credential and the referenced identity.

However, no financial institution or other registration authority could or would accept unlimited liability for all transactions/payments executed at a different financial institution. As an illustration, the top wire processor in terms of dollar volume is JPMorgan Chase Treasury Services, which processes more than $3 Trillion dollars in some single days. No third party financial institution or registration authority would be in a position to accept liability for JPMorgan's payment processes; conversely, JPMorgan would in turn not wish to accept liability for other financial institutions' payments.

Traditional PKI credentials, while interoperable in theory, alone are insufficient to overcome the following primary obstacles inherent to the use of interoperable credentials in high-value transactions:

1. Autonomy: If, for example, a bank (Second Bank) is contemplating recognizing credentials issued by another bank (First Bank), Second Bank would understandably want to audit First Bank's practices as a credential issuer against Second Bank's policies. Understandably, First Bank would be reluctant to agree to audits of its operations by competitors such as Second Bank.

2. Liability: Non-bank issuers of PKI credentials neither want, nor are in a position to accept, liability for failed high-value transactions. One way of addressing this problem is for a financial institution to issue its own credentials to limit risk and to recognize only the credentials it issues; however, this solution is not interoperable by definition.

3. Expense: If commercial financial institutions were to recognize non-bank certificate issuers for high-value commercial transactions, then commercial financial institutions would need to be connected to the non-financial institution certificate issuers. This is an added operational expense for financial institutions, creating a further barrier to achieving interoperability.

Authorizing online high-value commercial transactions requires a higher level of diligence when compared to consumer or retail transactions. A single high-value transaction may involve the transfer of hundreds of millions of dollars. The inherent risk associated with wholesale online banking compels many financial institutions to require additional security beyond authenticating users at login time. Additional security often takes the form of tighter controls and limits on the use of credentials. Ultimately, each financial institution trusts itself more than any other entity. This naturally leads to the practice of financial institutions issuing their own credentials.

Historically, a cash manager of a corporation would hold separate credentials from each financial institution with which he or she deals. While this satisfies the needs of commercial financial institutions, the corporation is forced to simultaneously hold accounts in multiple financial institutions, the insistence upon and proliferation of unique credentials is viewed by customers as poor service. Hence, it is increasingly important for global financial services providers to offer credentials that: (1) are interoperable to provide customer convenience, and (2) meet the needs of high-value commercial transactions in terms of authentication, authorization, and liability.

Therefore, there is a need in the art for an interoperable credential management system and method for online transactions, particularly high-value commercial transactions.

SUMMARY OF THE INVENTION

The present application describes embodiments of a system, method and computer readable medium which provides an improved alternative to the traditional PKI by providing a unique approach to the management of certificates and other credentials which allows for interoperability amongst different financial institutions or other parties. The system, method, and computer readable medium employ a certificate management model, herein referred to as a "Partner Key Management (PKM)" protocol or model that advantageously provides for interoperability amongst third parties and multiple independent (non-affiliated) financial institutions based on credentials such as asymmetric cryptography and certificates. According to embodiments of the present invention, the PKM model provides for an interoperable methodology wherein a user (on behalf of an associated corporation) may securely engage in a computer-based or online transaction with a bank or other financial institution. The PKM protocol focuses on authorization to use a credential.

According to embodiments of the present invention, a user (e.g., a cash manager or other individual associated with a corporation) obtains a credential from a credential distributor (i.e., any entity capable of providing credentials to a user and/or a corporation for use in the transmission, execution, and/or engagement in an online transaction via a computer network). According to embodiments of the present invention, the user may employ a single credential with multiple financial institutions without first arranging for the plurality of financial institutions to mutually agree upon a global credential policy and/or a common credential provider.

After obtaining the credential, the user submits a request to each of his or her financial institutions for permission to use the credential in connection with future transactions with the respective financial institutions. In response to the request, the financial institution confirms the identity of the user and examines the credential, in accordance with the financial institution's security standards. If the financial institution accepts the credential, the financial institution authorizes the credential to represent the user. According to an embodiment of the present invention, the user may register the same credential (i.e., request and receive authorization from a financial institution for the credential to represent the user) for use with multiple financial institutions to achieve interoperability.

According to embodiments of the present invention, the authorization process may vary between the financial institutions, with each financial institution setting its own operational policy governing the conditions in which the financial institution accepts the credentials based upon the financial institution's published operating rules. In this regard, the PKM program employs machine-readable policy statements which define and detail a participating financial institution's policy, rules, parameters, and/or requirements for accepting, processing, and managing transaction requests.

The machine-readable policy statement (e.g., a XML document), herein referred to as manifest of credential usage (MOCU), is an agreement between a third party sender (e.g., a corporation) and a bank which defines the rules, regulations, security provisions, conditions, requirements, and/or framework governing the manner in which transactions will be handled between the third party sender and the financial institution. The MOCU comprises information governing the corporation-financial institution relationship as it relates to online transactions, such as, for example, the type of permissible credential media, a list of approved credential providers, a revocation definition, a timestamp definition, a signature policy, and requirements concerning credential technology.

According to embodiments of the present invention, the PKM protocol provides a solution to the liability concerns which traditionally prohibited widespread interoperability amongst non-affiliated financial institutions. By addressing the interoperability issue, the PKM protocol establishes a "shared investment" model for subsidizing the token technology which is amortized across all of the financial institutions participating in/utilizing the PKM platform, without imposing a "shared" liability amongst the participants.

In addition, the PKM protocol allows each participating financial institution to deploy a single technology solution/implementation that handles multiple "islands of interoperability", wherein each island of interoperability is defined as a collection of entities that all operate in accordance with the same MOCU. This single-implementation approach allows the financial institutions the ability to adapt to and grow into new markets that have unique operating rules. In addition, the financial institution gains the advantage of not needing to deploy new software and hardware for each island, particularly multi-national financial institutions that manage transactions involving multi-national corporations wherein each country may have its own unique security infrastructure.

Furthermore, the system and method according to embodiments of the present invention provide for a shared cost model which amortizes the cost of the credentials amongst the participating financial institutions. Advantageously, participation by a plurality of financial institutions results in a per-user cost of a single credential that is lower than the per-user cost of multiple credentials in accordance with the conventional PKI framework.

According to embodiments of the present invention, an interoperable certificate management protocol referred to as the "partner key management" (PKM) protocol is described in detail. The PKM framework is configured to allow for the interoperability of credentials in the execution of high-value or other transactions.

According to embodiments of the present invention, a user may take advantage of credential interoperability by using the same credential at a plurality of different financial institutions for authentication or digital signatures. As used herein, the term "authentication" is intended to include, but is not limited to, the act of verifying the identity of a user, and is generally designed to protect against fraudulent logon activity. See, "2002 CISA Review Manual", Information Systems Audit and Control Association, ISBN: 1-893209-20-2. p. 399. Electronic authentication (E-authentication) is the process of establishing confidence in user identities electronically presented to an information system. See, Burr, William, E. et al., "Electronic Authentication Guideline", NIST 800-63. As used herein, the term "digital signature" is intended to include, but is not limited to, a piece of information, in a digitized form of a signature that provides sender authenticity (i.e., authenticates the sender), message integrity and non-repudiation. 2002 CISA Review Manual, p. 404. Non-repudiation is a service which prevents an entity from denying previous commitments or actions. When disputes arise due to an entity denying that certain actions were taken, a means to resolve the situation is necessary. For example, one entity may authorize the purchase of property by another entity and later deny such authorization was granted." See, Menezes, Alfred J. et al. "Handbook of Applied Cryptography", CRC Press LLC, Boca Raton 1997, ISBN: 0-8493-8523-7 p 4. One having ordinary skill in the art will appreciate that an authentication mechanism is not required to provide non-repudiation. The term "message integrity" refers to a means by which a recipient receives a message from a sender; and checks to ensure that the message was received in its entirety and without modification by an unauthorized third party.

When a user engages in an authentication process, the financial institution needs the user to prove his or her claimed identity. The user presents an authentication credential as a means of providing evidence of the user's claimed identity. Credential interoperability allows the user to employ the same authentication credential at a plurality of financial institutions. Credential interoperability may also allow the user to employ the same credential at a plurality of financial institutions for the purpose of digital or electronic signatures.

The PKM protocol imposes few restrictions on which credential provider (or certification authority) may be used in connection with the PKM system and reinterprets the authority of credentials in a constrained and controlled manner. In this regard, the third party sender/user may independently select a credential provider, without permission or approval from the financial institution with which the third party sender/user wishes to engage with in a transaction. In addition, the PKM protocol supports a general validation model, including a user validation model (also referred to as a sender validation model), which in conjunction with the reinterpretation of authority, scales better, provides interoperability, and reduces the cost for the relying party (e.g., the financial institution).

BRIEF DESCRIPTION OF THE DRAWINGS

The present invention will be more readily understood from the detailed description of exemplary embodiments presented below considered in conjunction with the attached drawings, of which:

FIG. 2A is a flowchart illustrating an exemplary approach to validation in accordance with one embodiment of the invention;

FIGS. 4 and 5 present a process flow (FIG. 4) and a schematic depiction (FIG. 5) of an exemplary processing of an online transaction according to the PKM protocol, according to an embodiment of the present invention.

Figure 1:
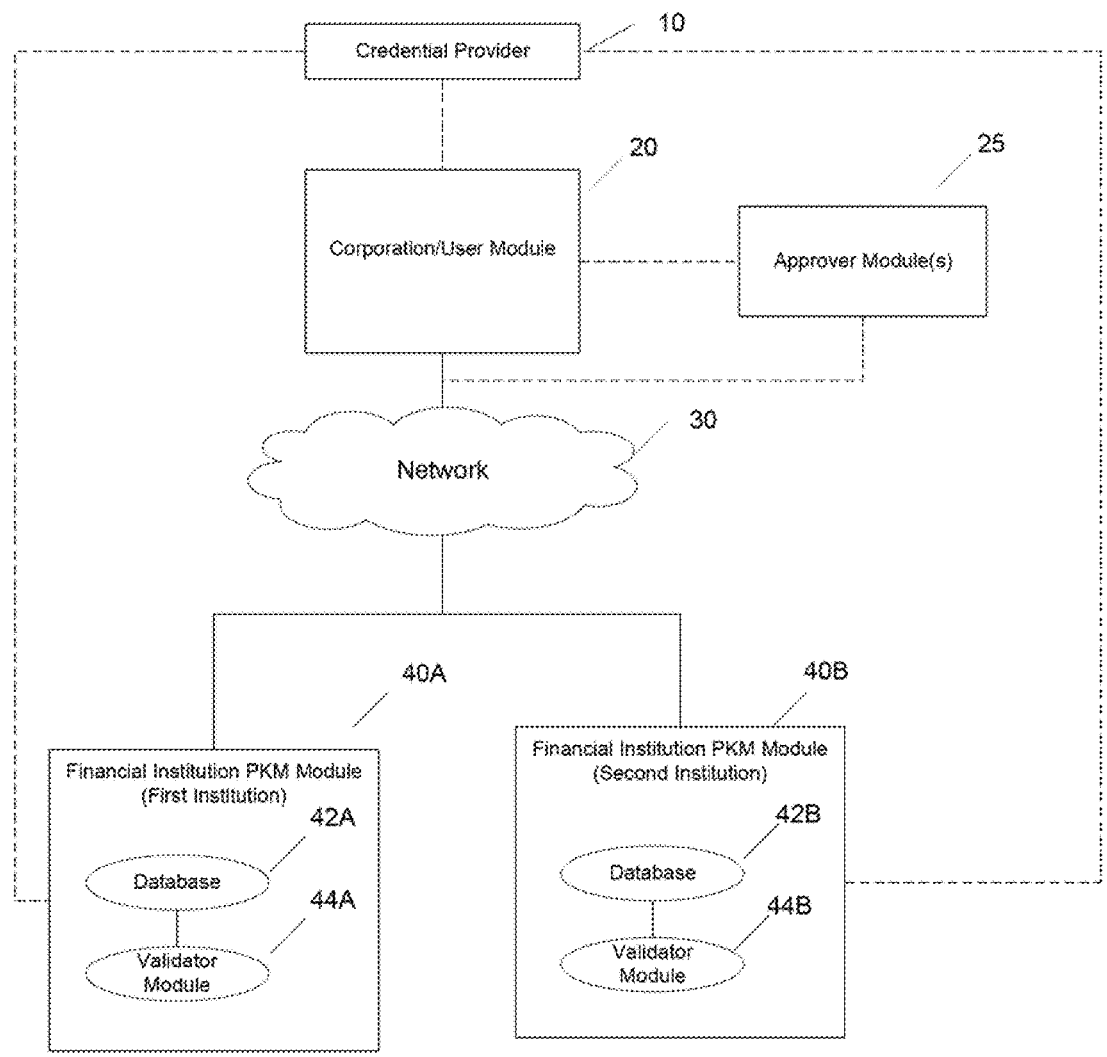
FIG. 1 illustrates an exemplary process according to the PKM model, in accordance with an embodiment of the present invention.

It is to be understood that the attached drawings are for purposes of illustrating the concepts of the invention and may not be to scale.

DETAILED DESCRIPTION OF THE INVENTION

The present invention relates to a system, method, and computer readable medium for employing a certificate management model, referred to as the "Partner Key Management (PKM)" protocol. The PKM protocol provides an improved framework for the processing of online transactions between an entity which desires to engage in online transactions (e.g., a corporation, organization, individual, etc.), referred to herein as a "corporation", communicatively connected to an institution (e.g., a financial institution, a healthcare institution, etc.), referred to herein as a "financial institution" or "institution", via a network using interoperable credentials. As used herein, the term "credential" is intended to include, but is not limited to, an object that authoritatively binds an identity (and optionally, additional attributes) to a token possessed and controlled by a person". See, NIST 800-63. As used herein, the term "authentication credential" is intended to include, but is not limited to, an electronic system that authoritatively binds an identity (and optionally, additional attributes) to a token possessed and controlled by a person or machine.

As used herein, the term "interoperable credential" is intended to include, but is not limited to, a single credential designed to provide security which is accepted by a plurality of different institutions (e.g., independent, non-affiliated entities) pursuant to the PKM protocol. As used herein, the term "communicatively connected" is intended to include any type of connection, whether wired or wireless, in which data may be communicated between one or more computers. The term "communicatively connected" is intended to include a connection between devices and/or programs within a single computer or between devices and/or programs on separate computers. The term "computer" is intended to include any data processing device, such as a desktop computer, a laptop computer, a mainframe computer, a personal digital assistant, a server, a handheld device, or any other device able to process data. Although the present application describes the PKM protocol primarily in the context of the management of financial-based transactions, one having ordinary skill in the art will appreciate that the PKM protocol may be used for securing any type of transaction, particularly those including sensitive data, such as, for example, a health care related transaction over a health care network.

According to an embodiment of the present invention, the third party sender, herein referred to as the "corporation", utilizes a Third Party Sender/User Module 20 to engage in an online transaction (i.e., any transaction executed via a computer network) via the network 30 with a "participating" institution (i.e., any institution utilizing the PKM protocol to facilitate online transactions with one or more third party senders) by communicating with the financial institution PKM module (first institution 40A, second institution 40B) using the interoperable credential. The Financial Institutions PKM Module 40A, 40B is computer-implemented module or agent configured to enable the Financial Institution to participate in the PKM protocol, as detailed in the embodiments described below.

The Third Party Sender/User Module 20 and Financial Institution PKM Module 40A, 40B may respectively include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The Third Party Sender/User Module 20 and Financial Institutions PKM Module 40A, 40B may respectively comprise one or more computing devices. The computing device (s) may have one or more processors, storage (e.g., storage devices, memory, etc.), and software modules. The computing device(s), including its processor(s), storage, and software modules, may be used in the performance of the techniques and operations described herein.

Figure 2:
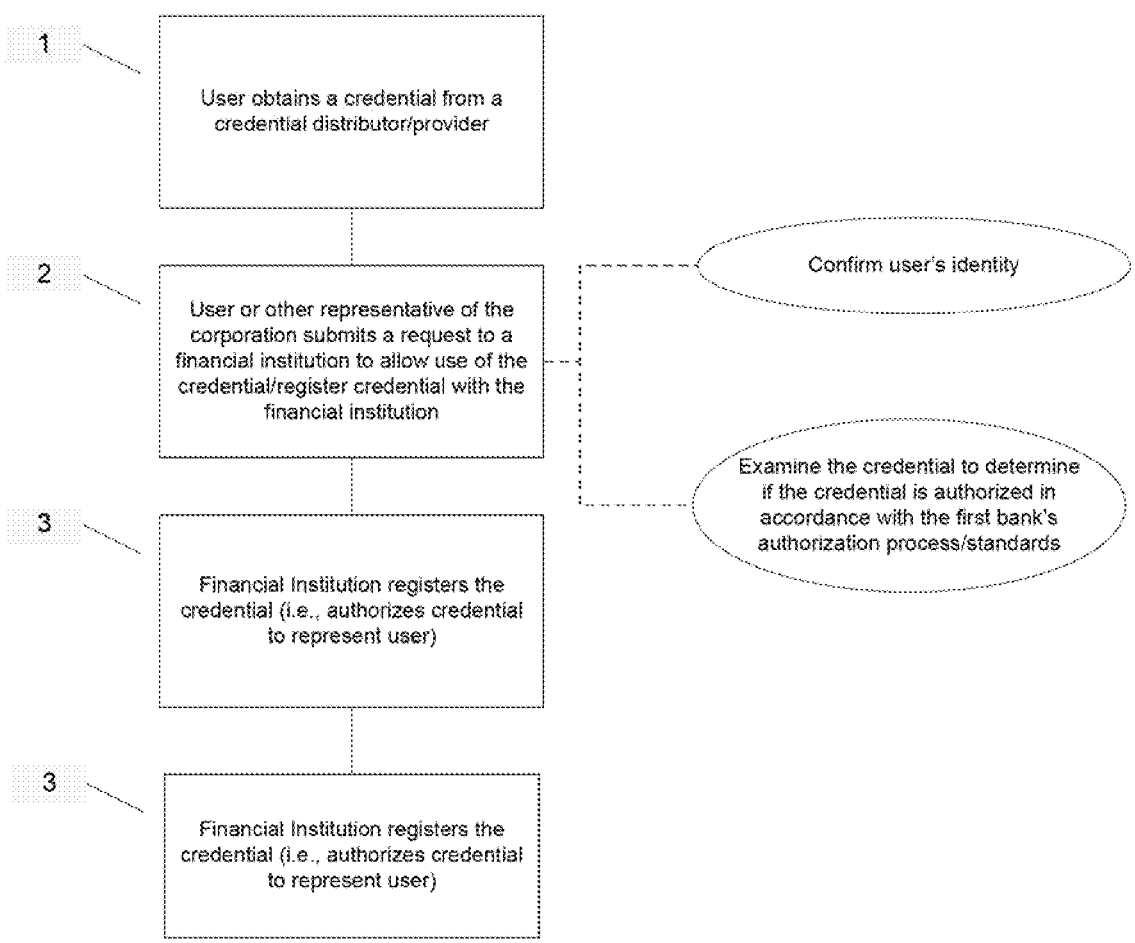
FIG. 2 is an exemplary system configured to implement the PKM protocol, according to an embodiment of the present invention.

FIG. 2 illustrates an exemplary process flow in accordance with embodiments of the present invention. With reference to FIGS. 1 and 2, in step 1, a user (i.e., an individual operating on behalf of or under the control of the third party sender/corporation), utilizes the third party sender/user module 20 to request a credential from a Credential Provider 10.

In step 1, in response to the request, the Credential Provider 10 provides the 'secure' credential to the third party sender/user module 20 (according to the security definition/requirements established by the user or user's company together with the Credential Provider). For example, a first Credential Provider 10 may only distribute credentials (e.g., certificates) on secured USB devices. A user may also obtain software to create self-signed certificates, and thereby create his or her own certificates implying that the user and the second Credential Provider are the same. Advantageously, according to embodiments of the present invention, the PKM protocol supports a general validation model, wherein each third party sender/user module 20 need only communicate with the Credential Provider or providers 10 to which the third party sender/user module 20 subscribes. In this regard, in the PKM framework, the institution PKM module 40 does not need to interact directly with the Credential Provider 10, except optionally for credential validation in the receiver validation model, described in detailed below. Advantageously, the third party sender/user may independently select a Credential Provider 10 with which it subscribes, without being limited to a credential provider which is has been previously approved by the financial institution.

In step 2, after obtaining a credential, the third party sender/user module 20 submits a request to each of his or her financial institution PKM modules 40A and 40B to register the credential (i.e., allow for use of the credential to secure future online transactions). According to an embodiment of the present invention, in this step, the financial institution PKM modules 40A and 40B securely assures itself of the user's true identity and examines the credential to determine if the credential meets the financial institution's security standards. For example, some financial institutions may prohibit credentials other than private keys that reside in a secured hardware token.

In step 3, if the financial institution PKM modules 40A and 40B accepts the credential, then the Financial Institution PKM modules 40A and 40B authorizes the credential to represent the user, thereby registering the association between the third party sender/user and the credential. The financial institution PKM modules 40A and 40B stores a record of the authorization/registration in a database 42A, 42B associated therewith. Optionally, the Financial Institution PKM modules 40A and 40B may further communicate with the Credential Provider 10 using the receiver validation model as an aspect of the validation provided by the Validator Module 44A and 44B. In this regard, the financial institution queries to determine if the Credential Provider 10 believes the credential to be currently valid."

Advantageously, the user may use the same credential with multiple financial institutions by appropriately registering the credential with the respective institutions, thereby generating an interoperable credential. One having ordinary skill in the art will appreciate that the authentication and authorization processes may vary between the financial institutions, wherein each institution may have its own operational policy governing the conditions in which it accepts the credential based upon the financial institution's published operating rules.

The interoperable credential provides flexibility, and convenience to the user/third party sender, while permitting the financial institution the ability to implement and follow their own procedure for accepting the credentials and allowing users to employ those credentials. The result is an infrastructure that allows the possibility of interoperability without mandating interoperability. Under the PKM protocol, two financial institutions may independently agree to accept a single credential under their own respective terms, thereby resulting in a credential that is interoperable between the user and each of the said institutions. Advantageously, no financial institution needs to rely upon any other financial institution or external credential provider. No two financial institutions need to communicate.

Figure 3:
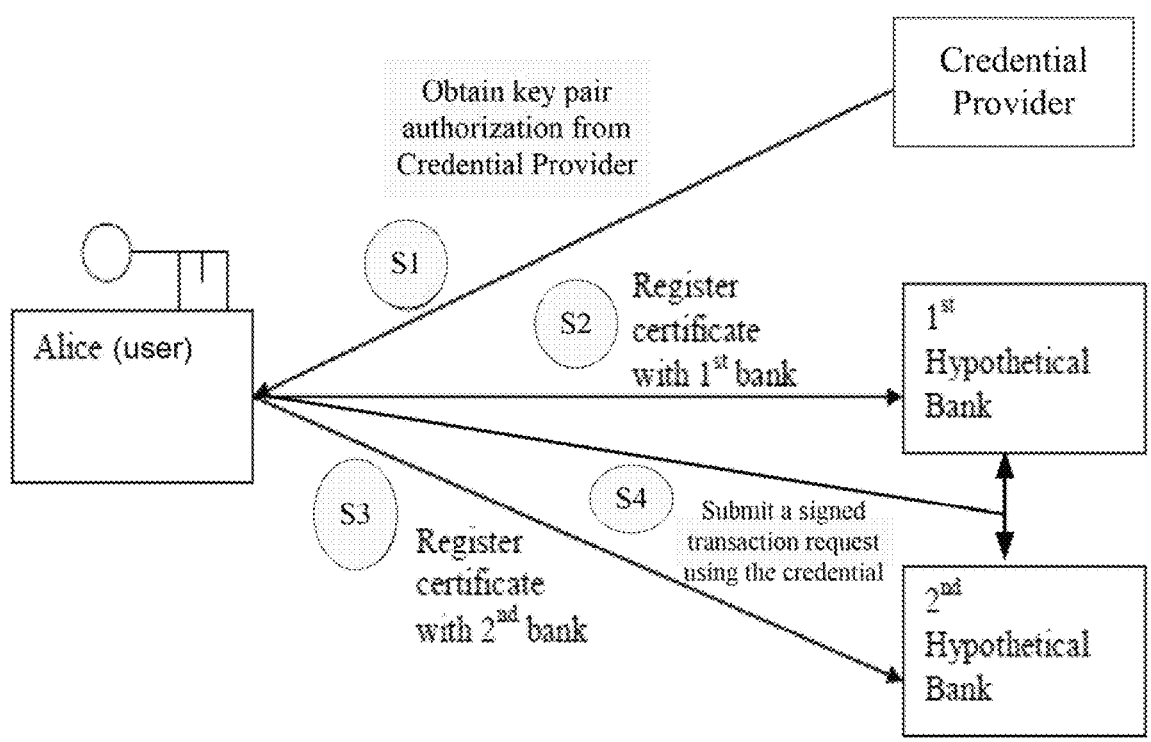
FIG. 3 illustrates an exemplary interoperable credential registration process, according to an embodiment of the present invention.

FIG. 3 illustrates an exemplary implementation of the credential registration process described above in connection with FIGS. 1 and 2. In the example, Alice is a Cash Manager (i.e., the user) employed by Widget Corporation (i.e., the third party sender). Widget Corporation typically performs its banking operations with two banks: First Hypothetical Bank and Second Hypothetical Bank. Both banks define their respective individual security and financial practices in a proposed agreement with Widget Corporation. Although these standards are not identical to one another, the corporate Treasurer of Widget finds both agreements to be acceptable.

As cash manager, Alice sends a request to a credential provider (labeled as "Credential Provider" in FIG. 3) to obtain a credential. The Credential Provider authorizes authentication credential distribution and provides Alice with key pair authorization, as shown in step S1 in FIG. 3. Next, Alice contacts First and Second Hypothetical Bank with the intention of registering the credential, as shown in steps S2 and S3. The two banks have the freedom to require any registration processes that they desire without concerning themselves with mutual consistency. For example, First Hypothetical Bank may require security administrators representing Widget Corporation to sign forms associating Alice with her certificate obtained from the Credential Provider. No requirement exists for Second Hypothetical Bank to implement this same registration process. In the PKM model, a financial institution may also serve as the credential provider. In Step S4 the user signs a transaction (e.g., request for money transfer) using the credential. Advantageously, those skilled in the art will note that the user may repeat Step S4 on a plurality of instances potentially signing a different transaction on each instant.

In the example, the corporate Treasurer at Widget Corporation gains the advantage of utilizing existing processes and security requirements in obtaining credentials. Furthermore, the user, Alice, may register the credentials with multiple financial institutions (e.g., First Hypothetical Bank and Second Hypothetical Bank) to establish interoperable credentials. Advantageously, under the PKM model, Alice only needs to manage a single interoperable credential, as opposed to two non-interoperable credentials (i.e., one for each bank). From the perspective of First Hypothetical Bank and Second Hypothetical Bank, the PKM model did not impose any liability terms which would be unacceptable to their corporate or legal teams. According to an embodiment of the present invention, First and Second Hypothetical Banks may share the cost of obtaining the credential under a shared cost model.

According to embodiments of the present invention, institutions (e.g., financial institutions, health care institutions, etc.) participating in the PKM program publish an XML document called the Manifest of Credential Usage (MOCU). For example, the MOCU may be written using an XML schema). The MOCU defines how a third party sender (i.e., the corporation) and a financial institution agree to work together, as governed by their mutually agreed upon security procedures. The third party sender and the financial institution have the freedom to establish any suitable rules, processes, standards, procedures, conditions, etc. upon which the two parties mutually agree, provided that the rules, processes, standards, procedures, conditions, etc. are supportable using programming logic.

According to embodiments of the present invention, the MOCU may include any suitable information that establishes the operating security procedures/processes, including, but not limited to, one or a combination of the following types of information:

1) a credential media definition which defines the type of media (e.g., a smart card, USB token, HSM, FIPS-140-2, or a software credential) that is acceptable for use in connection with a transaction under the MOCU;

2) a list of one or more approved credential providers (e.g., third party trusted providers, self-signed certificates, the corporation's infrastructure, and the financial institution's infrastructure) to which the third party sender and the financial institution mutually subscribe;

3) a credential technology definition which sets forth the type of technology required for the credential to be acceptable, such as, for example, a requirement that the certificate supports the X.509 standard. One having ordinary skill in the art will appreciate that the MOCU may specify other suitable technologies, such as, for example, the portable security transaction protocol (PSTP) (see, G. Benson, "Portable Security Transaction Protocol", Comput. Netw., 51(3): 751-766, 2007) which can create signatures using different kinds of credentials, e.g., one-time password, credit card numbers, IP addresses, or machine fingerprints.

4) a timestamp definition setting forth the timestamp rules and the timestamp provider, if any. Optionally, the timestamp definition may specify a real-time threshold value. Generally, the recipient must ensure that it receives and validates a signature before the threshold time limit after the timestamp. For example, a six hour threshold value means that the recipient must validate a signature before six hours expires after the timestamp.

5) a signature policy specifying the number of signatures required for a specific type of transaction, and the roles of signatories. For example, the signature policy may require both an individual signature and a corporate "system" signature in order to consider either signature as valid.

6) a revocation definition describing the type of permissible credential revocation mechanism, e.g., certificate revocation list (CRL), online certificate status protocol (OCSP) (see, M. Myers et al., "X.509 Internet Public Key Infrastructure Online Certificate Status Protocol—OCSP", RFC 2560 (Proposed Standard), June 1999), etc. The revocation definition also describes the party responsible for enforcing credential revocation; and it describes any specific usage practice. For example, the revocation mechanism may mandate that the recipient of a signature validate a CRL signed by a particular party.

The security requirements mutually agreed to by the financial institution and the corporation are reflected in a specific MOCU, or possibly a list of MOCUs. The security requirements may mandate that the user and/or corporation must attach the MOCU on each signed transaction in order to consider any signature valid. In some embodiments of the present invention multiple MOCUs are attached.

It is to be appreciated by one having ordinary skill in the art that other information may be included in the MOCU to establish the security requirements mutually agreed to by the sender and the financial institution. According to an embodiment of the present invention, the security requirements may mandate that the sender (i.e., the corporation) attach the MOCU to each signed transaction in order for the signature to be valid.

According to an embodiment of the present invention, the PKM protocol enables each participating institution to avoid liability relating to transactions executed by another participating bank within the PKM framework, while allowing for credential interoperability.

As shown in FIG. 1, the Financial Institution PKM Module 40A, 40B comprises a Validator Module 44 (identified in FIG. 1 as Validator Module 44A for Financial Institution PKM Module of the First Institution 40A; and Validator Module 44B for Financial Institution PKM Module of the First Institution 40B), a computer module configured to implement a validation model selected by the financial institution. Exemplary approaches to validation which may be implemented by the financial institutions are described herein in connection with steps 4 and 4a-4c of FIG. 2A. One having ordinary skill in the art will appreciate that validation by the financial institution is an optional step and may be performed in accordance with the exemplary approaches identified in steps 4a-4c, or in accordance with another suitable validation approach.

One exemplary Validator Module 44A, 44B, for use in connection with the present invention is an XML schema validator and general-purpose parser. According to embodiments of the present invention, each participating financial institution may select any of the following three exemplary revocation models, or, alternatively, build its own variant model, for use in accordance with the PKM protocol of the present application, as illustrated in FIG. 2A:

1) Receiver validation (step 4a): The receiver validation model is typically used in a PKI model. With reference to the previously described example, under a receiver validation model, Alice (i.e., the user) submits a signed transaction to the financial institution. Upon receipt, the financial institution validates Alice's signature against a CRL or OCSP responder managed by the certificate provider.

2) Sender validation without evidence (step 4b): In a sender validation without evidence model, Alice submits a signed transaction to the financial institution, but the financial institution performs no revocation check. The corporation (i.e., Alice's employer) and the financial institution manage Alice's credential using a mechanism external to the signed transaction. For example, a user at Alice's employer is given access to the approver module 25. When the Approver Module 25 decides that he or she wants to disable Alice's credential, the Approver accesses the Approver Module 25 in order to execute the un-approve step. The Approver Module 25 contacts each Financial Institution PKM Module 40A and 40B independently. The Approver Module 25 instructs each Financial Institution PKM Module 40A and 40B to stop accepting Alice's credential. Upon receipt of the un-approve instruction from an authorized user, the financial institution stops accepting Alice's credential. Please note, that the person who approves the initial setup of Alice's credential at Financial Institution PKM Module 40A and 40B need not be the same person who un-approvers. Furthermore, the same Approver Module 25 may be used in both the Approve and Un-approve steps, or alternatively, they may use different modules. Under this revocation model, if Alice proves to be an untrustworthy individual, then the approver/un-approver may reserve the right to disable Alice's credential. For example, if Alice has a gambling problem, then authorized representatives of Alice's company may contact each of its financial institutions with the instruction to deny Alice's credential. Another example which also results in credential disabling is one where Alice contacts each financial institution because she suspects that her own credential has been compromised (i.e., lost or stolen).

3) Sender validation with evidence (step 4c): In a sender validation with evidence model, Alice submits her certificate to an OCSP responder, and obtains a response signed by the OCSP responder. Next, Alice signs the transaction and the OCSP response, and then submits the signed transaction and signed OCSP response to the financial institution. The financial institution validates both Alice's signature and the OCSP responder's signature. If the financial institution finds no error, then the financial institution accepts and executes the requested transaction.

In another embodiment of the present invention, Alice sends a CRL as opposed to an OCSP response. That is, Alice submits the signed transaction and signed CRL to the financial institution. The signed CRL is signed by the Credential Provider 10 or the credential provider's authorized representative and indicates that Alice's certificate has not been revoked.

One having ordinary skill in the art will appreciate that multiple financial institutions may all accept the same credential from Alice, while requiring/implementing different revocation models.

An OCSP responder, or a certificate revocation list, is merely revocation mechanisms optimized for scalability. As opposed to requiring the Alice's corporation to contact each of its financial institutions, an OCSP responder or CRL provides a centralized repository which handles certificate revocation. One advantage of the OCSP responder or certificate revocation list is its scalability. For example, if Alice were authorized to engage in transactions on accounts at hundreds or thousands of financial institutions, then the sender validation without evidence model would not be preferred because the sender would need to contact too many financial institutions. However, in practice, corporations tend to contact each of their financial institutions whenever a user's credential changes status because the corporations do not have accounts at too many financial institutions. Even if the financial institution happens to use the traditional receiver validation model, the corporations often contact the financial institutions anyway. So, in financial services, the advantage of receiver validation is relatively small. Frequently, some financial institutions require immediate notification of such status changes. Practically, it is in the corporation's best interest to directly contact the financial institutions if the corporation ceases to trust Alice to authorize high-value transactions.

Advantage of sender validation is that it better handles expense and time to market. Suppose, for example, a corporation agrees to the services of a new credential provider. Credential interoperability encourages a dynamic market by allowing the corporation the freedom to choose any acceptable credential provider. In the receiver validation model, the corporation could not use that credential with its financial institution until the financial institution agrees to build an online connection to the credential distributor's OCSP responder or certificate revocation list. According to a user validation model (also referred to as a sender validation model), on the other hand, the sender (i.e., the user/corporation) may immediately use the credential with the financial institution without waiting for the costly and possibly slow technology development process.

According to an embodiment of the present invention, the signature used in connection with a transaction includes the MOCU and transaction parameters such as, for example, relevant account numbers, a monetary amount, and recipient/beneficiary information. As shown in FIGS. 1 and 5, the Validator Module 44A, 44B is configured to check each incoming MOCU against the rules specified by the financial institution and the third party sender. The agreed upon rules may be manifested in a list of acceptable MOCUs, referred to as the acceptance list, which is stored in the database 42A, 42B associated with the Validator Module 44A, 44B.

Advantageously, according to an embodiment of the present invention, the financial institution may implement a new policy by adding a new MOCU to its acceptance list. In this regard, the financial institution may adopt any number of MOCUs for use by the financial institution under the PKM program, and may efficiently add new policies without deploying new software.

When the financial institution receives a signed transaction from a third party sender/user module 20, the financial institution PKM module 40A, 40B looks up the MOCU covered by the signature associated with the requested transaction against the list of the allowable MOCUs maintained in the financial institution's database 42A, 42B. According to an embodiment of the present invention, the financial institution's system may include hardware and/or software configured to process MOCUs. When the financial institution receives a signature, the Validator Module 44 executes the required cryptography and then submits the signature to the MOCU processor for MOCU processing. The financial institution's hardware/software architecture exhibits a high degree of agility because it may be configurable thereby avoiding programming logic changes upon each policy change.

Figure 4A:
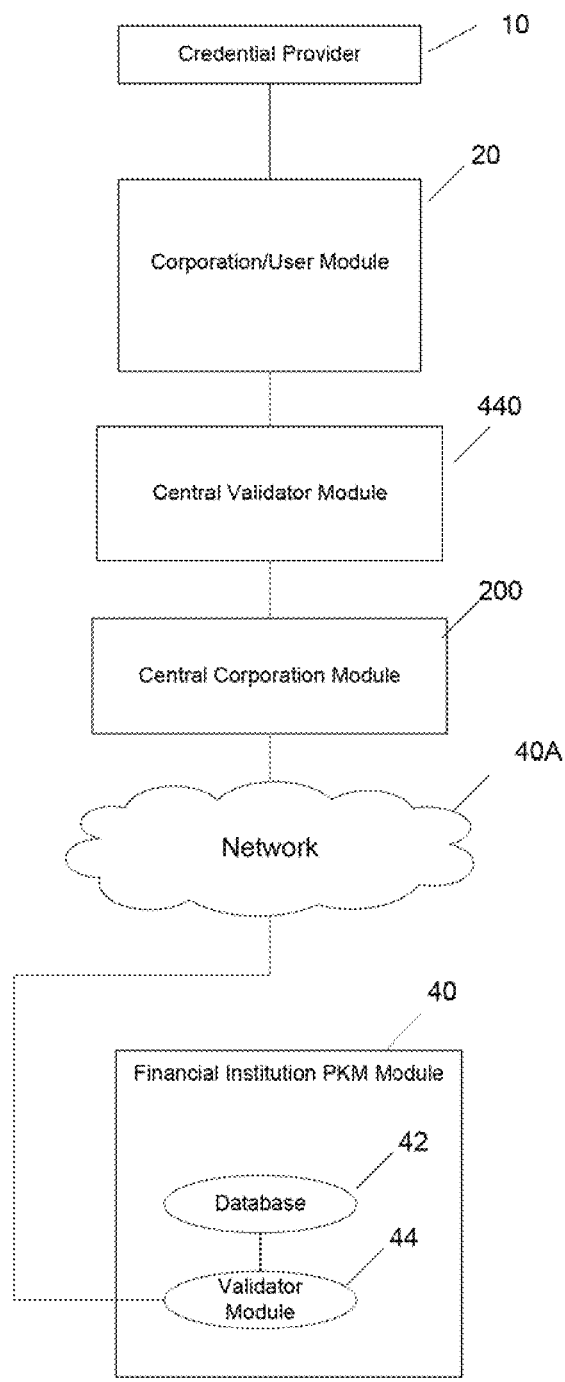
FIG. 4A is a flowchart illustrating a further approach to validation in accordance with an embodiment of the invention.

An embodiment of the present invention is described in connection with FIGS. 4A, 4 and 5, by illustrating details of sender validation with evidence 4C of FIG. 2A. As illustrated in FIGS. 4A, 4 and 5, a user (Alice) wishes to make a transaction with a financial institution (referred to as the "bank" in the Figures). To initiate the process, in step A, Alice utilizes a Corporation/User Module 20 to execute a personal signature using her credential over the transaction request and a MOCU. Next, in step B, Alice sends the signed transaction request to a Validator Module 440. In step C, the Validator Module 440 checks for revocation, and obtains a digitally signed revocation statement (i.e., a signed CRL or OCSP response) from a CRL or OCSP responder, as shown in FIG. 5. In step D, the Validator Module 440 provides all of the collected information to a Corporation Module 200. The Corporation Module 200 counter-signs Alice's signed transaction, the signed revocation statement, a timestamp, and the Validator Module's 440 MOCU. Next, the information is sent through the Network 30 to the Financial Institution PKM Module 40, 40A. Next, in step E, the Financial Institution PKM Module 40, 40A validates all of its incoming information including both MOCUs, and if compliant, processes the requested transaction. According to embodiments of the present invention, the Central Validator Module 440 may reside in the same entity as the Corporation/User Module 20. In this embodiment of the present invention, individual users execute signatures, but the signature is not valid unless countersigned by the Central Corporation Module 200. The Central Corporation Module 200 does not produce this signature unless directed by the Central Validator Module 440. The Central Validator Module 440 does not authorize the counter signature unless the central valuator module first validated the user's signature, MOCU, revocation information, and any other relevant corporate policy. Each Corporation/User Module 20 and each Central Corporation Module 200 may sign their own MOCUs which need not be the same. However, the Validator Module 44, 44A at the financial institution 40A will not accept a signature unless both MOCUs are in accordance with expectations.

According to embodiments of the present invention, the validator module 44A or 44B described in connection with FIGS. 4 and 5 may be controlled, operated, and managed by a trusted third party, or the financial institution (i.e., the bank). The Central Validator Module 440 may be controlled by a trusted third party or preferably, the user/sender or corporation (i.e., a user/sender validation model).

The sender validation with evidence model ensures proper security provided that both the corporation and the bank trust the signature of the revocation point. However, if the revocation point's credential were revoked, then both the validator and the bank have the responsibility to detect the revocation event of the revocation point (e.g., the provider of the CRL or the operator of the OCSP responder). The corporation and the bank may agree to whom to assign liability in the case where a Central Validator Module 440 improperly checks for revocation before directing a countersignature.

One advantage of the sender validation without evidence model 4b and the sender validation with evidence model 4c is that they improve the bank's agility. The bank merely needs to validate the MOCUs without building a connection to every revocation point. The corporate is happy because the banks do not refuse credential providers or charge an extra fee for special-purpose connection points. The banks are happy because they may immediately serve more customers at a low marginal cost.

Figure 6:
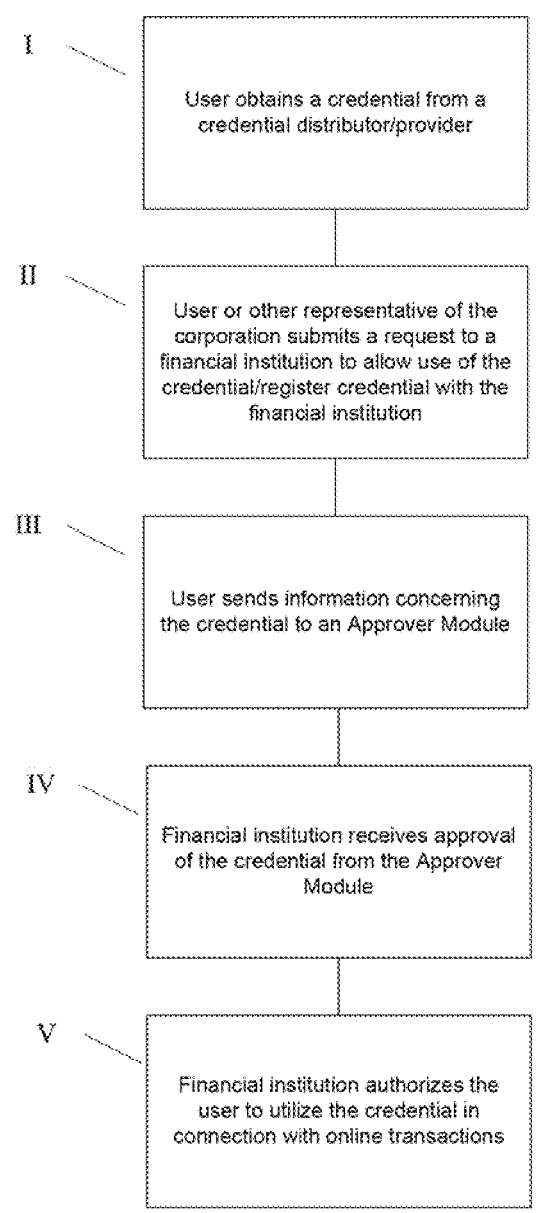
FIG. 6 illustrates an exemplary process flow of the PKM protocol, according to an embodiment of the present invention.

According to an alternative embodiment of the present invention is described in connection with FIGS. 1 and 6, a user and an Approver Module 25 (also referred to generally as an "approver") represent a corporation. Via the Corporation/User module 20, the Corporation/User Module 20 obtains a credential from a Credential Provider 10, in step I. In step II, based on a request from the user, the Financial Institution PKM Module 40A, 40B registers the credential. In step III, the Corporation/User Module 20 provides information concerning the credential to the Approver Module 25. The Approver Module 25 may be configured to consider any suitable information (e.g., user name, user position within corporation, user authority level, nature of transactions engaged in using the credential, etc.) and apply any suitable rules to determine whether or not to approve use of the credential by the user. According to an exemplary embodiment of the present invention, the Approver Module 25 may apply rules and conditions established by the corporation in making the approval/denial decision. Based on the information provided by the Corporation/User Module 20 regarding the credential, the Approver Module 25 determines whether to approve the user's use of the credential. Next, in step IV, assuming approval by the Approver Module 25, the Financial Institution PKM Module 40A, 40B receives approval of the credential from the Approver Module 25. After successfully completing step IV, the Financial Institution PKM Module 40A, 40B allows the Corporation/User. Module 20 to use the credential for authentication and digital signatures, when applicable, in step V.

According to an embodiment of the present invention in step II the user or other representative signs the submitted request and a MOCU in accordance to the means and variants described herein.

According to an embodiment of the present invention in step III the approver module signs the submitted request and a MOCU in accordance to the means and variants described herein.

According to an alternative embodiment of the present invention, the order of step II and step III described in connection with FIG. 4 is reversed. As such, the Corporation/User Module 20 sends information concerning the credential to the Approver Module 25 prior to registration of the credentials with the Financial Institution PKM Module 40A, 40B.

According to an embodiment of the present invention, in addition to registering the credential with a first financial institution according to the embodiments described above, the Corporation/User Module 20 (i.e., under the control/direction of the user or other representative of the corporation) sends a request for registration of the credentials to one or more other financial institutions (i.e., the credential is registered with a plurality of financial institutions) according to the steps described above in connection with FIG. 6, thereby resulting in an interoperable credential. The process for registering the credentials with the plurality of financial institutions may be implemented as shown in FIG. 6 (i.e., steps I-IV) or the alternative embodiment wherein step IV is performed prior to the performance of step III. With reference to FIG. 1, the plurality of financial institutions (via the Financial Institution PKM Module 40A, 40B), having registered the credentials, may further communicate with the Credential Provider 10 when using the receiver validation module to obtain a CRL or interact with an OCSP responder.

According to an embodiment of the present invention the means by which the Credential Provider 10 provides revocation information is neither a CRL nor an OCSP responder, but a different means of providing revocation information.

According to an embodiment of the present invention the party that provides revocation information is not the Credential Provider 10, but a different party authorized to provide revocation information.

According to an embodiment of the present invention, the corporation may create its own certificates, thereby omitting the need for a separate Credential Provider 10 from the process/system. With reference to FIG. 6, in this embodiment, the credential registration process comprises steps I, II, III, and IV (as described above), wherein step I is completely executed by the corporation (i.e., the corporation creates its own credentials and provides the credentials to its users). In another embodiment, in the registration step (step I), the user creates a self-signed certificate on his or her computer workstation without needing to communicate with other computers/machines, even within his or her own corporation. According to this embodiment the Corporation/User Module 20 and Credential Provider 10 are the same entity/computer.

According to an embodiment of the present invention, the Corporation/User Module 20 is communicatively connected to a plurality of Approver Modules 25. In this embodiment, the Corporation/User Module 20 and the plurality of Approver Modules 25 are managed by or otherwise represent a corporation. With reference to FIG. 6, the registration process comprising steps I-V is modified such that in step III, the user provides information concerning the credential to the plurality of Approver Modules 25. In step V, the Financial Institution PKM Module 40A, 40B requires receipt of approval of the credential from all of the Approver Modules 25 before allowing the user to use the credential for authentication and digital signatures, when applicable. Put another way, the Financial Institution PKM Module 40A, 40B does not permit use of the credential until all required Approver Modules 25 (i.e., the plurality of approvers) submits their respective approvals.

In accordance to an embodiment of the invention the Financial Institution PKM Module 40A, 40B applies a specific rule for the required approvers which may be more than one approver, but less than all approvers, e.g., 3 of 5 approvers. In accordance to an embodiment of the invention approvers may have different approval roles, and the policy requires multiple approvers representing each role.

One having ordinary skill in the state of the art will appreciate that the Approver Module 25 may comprise a specific individual (i.e., an individual computer) or be comprised of a group of individuals (i.e., a group of individual computers). According to an embodiment of the present invention, any member of the authorized approver group or role may submit the approval to the Financial Institution PKM Module 40A, 40B.

In a further embodiment of the invention, no individuals or groups are required for the approval. In this embodiment, the Financial Institution PKM Module 40A, 40B permits use of the credential following satisfaction of steps I and II.

In a further embodiment of the invention, different financial institutions impose different registration rules. For example, one financial institution may require two approval groups prior to authorizing a credential, while another financial institution may require one approver, and still another financial institution may require no approvers. Advantageously, in this embodiment of the PKM protocol, the financial institutions may configure their respective Financial Institution PKM Modules 40A, 40B to implement the financial institution's desired approval configuration. In yet another example, one Financial Institution PKM Module (i.e., Financial Institution PKM Module 40A) may require one sequence of steps ordering (e.g., a sequence of steps I, II, III, IV, V in FIG. 6), while another Financial Institution PKM Module (i.e., Financial Institution PKM Module 40B) may call for a different sequence of steps (e.g., a sequence of steps I, III, II, IV, and V).

In one embodiment of the invention, the registration process allows a plurality of users to share the same credential.

In one embodiment of the invention, the credential is a digital certificate. The user may have private keying material that the user keeps on local storage media to be connected to his or her computer. In one embodiment of the present invention the certificate is signed by the Credential Provider 10 or a suitable certificate authority, known to those having ordinary skill in the art. In one embodiment of the present invention, a certificate path leads up to a root certificate signed by the Credential Provider 10. In one embodiment of the invention, the certificate is self-signed. In yet another embodiment of the present invention, the certificate is not signed.

In an alternative embodiment of the present invention, the credential is an IP address and digital signatures are created using PSTP (Portable Security Transaction Protocol). In this embodiment, after the Financial Institution PKM Module 40A, 40B accepts the IP Address (i.e., the credential) for use, the Financial Institution PKM Module 40A, 40B prohibits electronic interaction with the user unless the user connects to the financial institution from the registered IP address. In one embodiment of the invention, the user registers a range or plurality of IP addresses. After the Financial Institution PKM Module 40A, 40B accepts the range of IP addresses for use, the Financial Institution PKM Module 40A, 40B prohibits electronic interaction with the user unless the user connects from an IP address within the registered range. In one embodiment of the invention, the user registers a collection of ranges of IP addresses. After the Financial Institution PKM Module 40A, 40B accepts the collection of ranges of IP addresses for use, the Financial Institution PKM Module 40A, 40B prohibits electronic interaction with the user unless the user connects from an IP address within the one of the registered range. In one embodiment of the invention, the user registers computer addresses using some format other than IP addresses, e.g., MAC address.

According to an embodiment of the present invention, the invention, the credential is a one-time password and digital signatures are created using PSTP, as described in detail in U.S. Publication No. 2005/0091492, titled "Portable Security Transaction Protocol" by G. Benson et al., the entirety of which is hereby incorporated herein by reference. Before a user registers, the Financial Institution PKM Module 40A, 40B maintains a table or other record in storage which relates a confidential "seed" to a publicly available "serial number". In the registration process, the user registers a particular "serial number" to instruct the Financial Institution PKM Module 40A, 40B to associate the user, serial number, and seed together. The approval process provides further evidence to the Financial Institution PKM Module 40A, 40B that it is correctly associating the specific user with the associated serial number. After registration, the user authenticates using the One-Time Password, or executes a digital signature using the one-time password (see e.g., the method of executing digital signatures with one-time passwords, described in detail in U.S. Publication No. 2005/0091492, titled "Portable Security Transaction Protocol", which is incorporated by reference herein). The Financial Institution PKM Module 40A, 40B looks up the user's registered serial number associated with the userid. Next, the Financial Institution PKM Module 40A, 40B finds the confidential "seed" associated with the serial number. Next, the Financial Institution PKM Module 40A, 40B validates the user's submitted one-time password.

In one embodiment of the invention, the credential is a machine fingerprint and signatures are created using PSTP. As used herein, the term "machine fingerprint" is intended to include, but is not limited to, a unique characterization of a particular machine (i.e., computing device) that the machine may communicate with the Financial Institution PKM Module 40A, 40B. After the Financial Institution PKM Module 40A, 40B accepts the machine fingerprint for use, the Financial Institution PKM Module 40A, 40B prohibits electronic interaction with the user unless the user connects from a machine/computer with the registered fingerprint. In a further embodiment of the invention, the user registers a plurality of machine fingerprints. After the Financial Institution PKM Module 40A, 40B accepts the plurality of machine fingerprint for use, the Financial Institution PKM Module 40A, 40B prohibits electronic interaction with the user unless the user connects from a machine with one of the registered machine fingerprints. Example elements that may contribute to a machine fingerprint include, but are not limited to, any collection or sub-collection of: machine address, software installed on a machine, version numbers of software installed on a machine, machine name, and machine hardware characteristics. This list is intended to provide example elements that may be used as the basis of the machine fingerprint, and is not meant to be an exhaustive list. One having ordinary skill will appreciate that other suitable elements may be used in connection with defining a machine fingerprint.

According to an embodiment of the present invention, with reference to FIG. 4, steps I-V are performed electronically, wherein each step may be authenticated by a credential in order to ensure that both peers agree as to the party that executes the step. Furthermore, the types of credentials used to authenticate each of the steps do not need to be the same. The credential used in the authentication of each step may be the same as the registered credential. In one embodiment of the present invention, the type of credential used in the authentication of each step may be different than the registered credential. For example, the user may authenticate step II and step III using passwords. In this example, step IV may be authenticated using a one-time password. Optional, the credential in this example may be a certificate.

Although the modules 40A and 40B are labeled and described in the present application as "Financial Institution PKM Modules" for the purposes of illustration, one having ordinary skill in the art will appreciate that the PKM modules may be operated by an entity which is not in the financial services industry. In particular, the entity/entities may be from any industry which may use interoperable credentials, such as, for example, the healthcare industry. In an embodiment of the present invention, one or more of the entities illustrated in FIG. 1 are individuals, as opposed to corporations, financial institutions, non-financial institutions, or credential providers.

Although the Corporation/User Module 20 is labeled corporation/user for the purpose of illustration, one having ordinary skill in the art will appreciate that corporation/user module might not be operated directly by a person or persons. Rather, the Corporation/User Module 20 may be an autonomous computer system.

As shown in FIG. 1, the Corporation/User Module 20, the Credential Provider 10, and/or the Financial Institution PKM Module 40A, 40B may be communicatively connected to one another according to any number of configurations wherein the optional connections are depicted with dashed lines, thereby allowing the respective entities to communicate via electronic means according to the variety of embodiments described in detail in the present application.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method comprising:
   storing, by an institution computer of a first institution, a file comprising a stored policy statement mutually agreed upon by the first institution and a user, wherein the stored policy statement comprises security procedures governing transactions between the first institution and the user;
   generating a credential to execute a plurality of online transactions with the first institution and a second institution;
   generating a digital signature with the credential using Portable Security Transaction Protocol;
   receiving, by the institution computer, a request from the user for registration of the credential;
   examining, by the institution computer, the request for registration of the credential;
   determining whether the request for registration of the credential complies with registration requirements established by the first institution;
   in response to determining that the request for registration of the credential complies with the registration requirements established by the first institution, registering, by the institution computer, the credential to represent the user with regard to a plurality of online transactions with the first institution;
   receiving, from the user, a request for an online transaction comprising a received policy statement and the digital signature, wherein the received policy statement comprises security procedures governing transactions between the first institution and the user;
   verifying the identity of the user by examining the digital signature;
   determining whether the received policy statement complies with the stored policy statement; and
   in response to verifying the identity of the user and determining that the received policy statement complies with the stored policy statement, authorizing, by the institution computer, the requested online transaction; and
   executing the requested online transaction.

2. The method of claim 1 further comprising the steps of: receiving, by the institution computer, an approval of the credential from an approver representing the user's organization; and
   determining, by the institution computer, whether the approver is on a list of approvers.

3. The method of claim 2, wherein an approval is received from multiple approvers.

4. The method of claim 2, wherein an approval 1 s received from multiple approvers with different roles.

5. The method of claim 1, wherein the first institution and the second institution are financial institutions.

6. The method of claim 1, further comprising independently registering the credential with the second institution in accordance with registration requirements established by the second institution.

7. A non-transitory computer-readable medium comprising computer executable software code executable by a processor to cause the processor to perform a method comprising:
storing, by an institution computer of a first institution, a file comprising a stored policy statement mutually agreed upon by the first institution and a user, wherein the stored policy statement comprises security procedures governing transactions between the first institution and the user;
generating a credential to execute a plurality of online transactions with the first institution and a second institution;
generating a digital signature with the credential using Portable Security Transaction Protocol;
receiving, by the institution computer, a request from the user for registration of the credential;
examining, by the institution computer, the request for registration of the credential;
determining whether the request for registration of the credential complies with registration requirements established by the first institution;
in response to determining that the request for registration of the credential complies with the registration requirements established by the first institution, registering, by the institution computer, the credential to represent the user with regard to a plurality of online transactions with the first institution;
receiving, from the user, a request for an online transaction comprising a received policy statement and the digital signature, wherein the received policy statement comprises security procedures governing transactions between the first institution and the user;
determining whether the received policy statement complies with the stored policy statement; and
in response to determining that the received policy statement complies with the stored policy statement, authorizing, by the institution computer, the requested online transaction.

8. The non-transitory computer-readable medium of claim 7, wherein the software code is further operable to cause the processor to independently register the credential with the second institution in accordance with registration requirements established by the second institution.

9. A system comprising:
a memory configured to store credential registration requirements established by a first institution and a stored policy statement mutually agreed upon by the first institution and a user, wherein the policy statement comprises security procedures governing transactions between the first institution and the user; and
a processor coupled to the memory, the processor configured to:
generate a credential to execute a plurality of online transactions with the first institution and a second institution;
generate a digital signature with the credential using Portable Security Transaction Protocol;
receive a request from the user for registration of the credential;
examine the request for registration of the credential;
determining whether the request for registration of the credential complies with the credential registration requirements established by the first institution,
in response to determining that the request for registration of the credential complies with the registration requirements established by the first institution, register the credential to represent the user with regard to a plurality of online transactions with the first institution;
receive, from the user, a request for an online transaction comprising a received policy statement and the digital signature, wherein the received policy statement comprises security procedures governing transactions between the first institution and the user;
determine whether the received policy statement complies with the stored policy statement; and
in response to determining that the received policy statement complies with the stored policy statement, authorize the requested online transaction.

10. The system of claim 9, wherein the processor is further configured to independently register the credential with the second institution in accordance with registration requirements established by the second institution.

11. A method for establishing an interoperable credential of a first type selected from a group consisting of: a certificate, a one-time password, an IP address, and a machine fingerprint, for use in an online transaction between a user and an institution, the method comprising:
storing, by an institution computer of a first institution, a file comprising a stored policy statement mutually agreed upon by the first institution and a user, wherein the stored policy statement comprises security procedures governing transactions between the first institution and the user;
generating the interoperable credential to execute a plurality of online transactions with the first institution and a second institution;
generating a digital signature with the interoperable credential using Portable Security Transaction Protocol;
receiving, by the institution computer, a request from the user for registration of the credential, wherein the request is signed by the digital signature using a credential of second type selected from a group consisting of: a certificate, a one-time password, an IP address, and a machine fingerprint, wherein the first type and the second type are not the same;
examining, by the institution computer, the request for registration of the credential;
determining whether the request for registration of the credential complies with registration requirements established by the first institution;
in response to determining that the request for registration of the credential complies with the registration requirements established by the first institution, registering, by the institution computer, the credential to represent the user with regard to a plurality of online transactions with the first institution;
receiving, from the user, a request for an online transaction comprising a received policy statement and the digital signature including the interoperable credential, wherein the received policy statement comprises security procedures governing transactions between the first institution and the user;
determining whether the received policy statement complies with the stored policy statement; and
in response to determining that the received policy statement complies with the stored policy statement, authorizing, by the institution computer, the requested online transaction if the received policy statement complies with the stored policy statement associated with the user.

12. The method of claim 11, further comprising independently registering the credential with the second institution in accordance with registration requirements established by the second institution.

\* \* \* \* \*